April 16, 1940.  R. A. SHORT  2,197,596
BOTTLE WIPER
Original Filed July 14, 1938
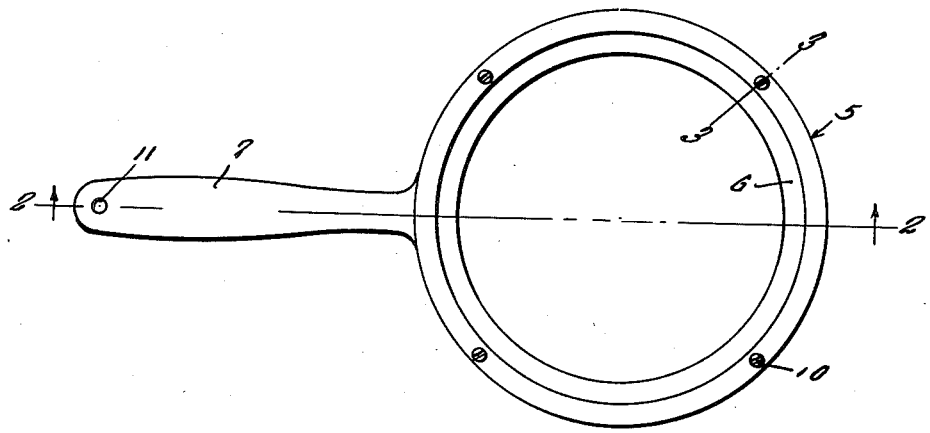
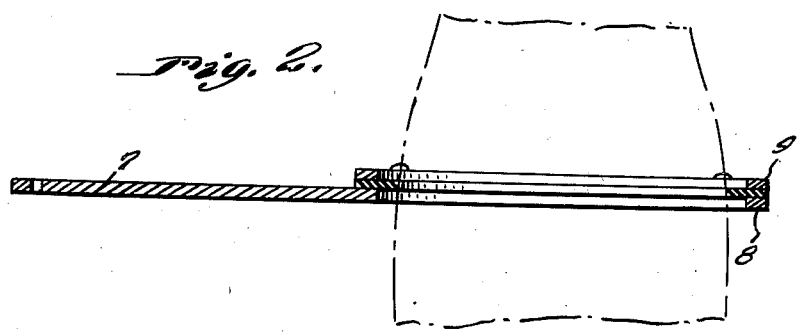
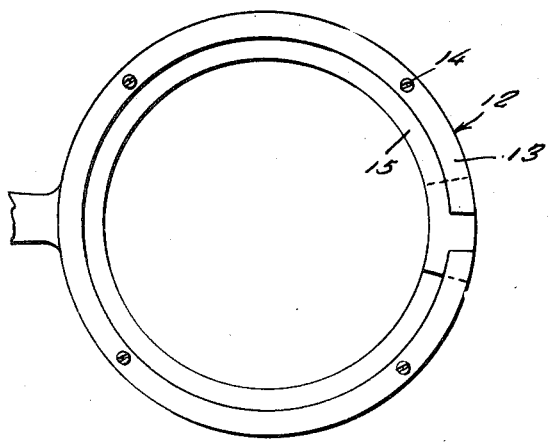
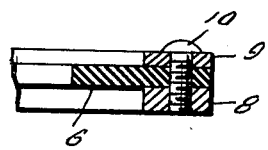
Inventor
R. A. Short
By Clarence A. O'Brien
and Hyman Berman
Attorneys Patented Apr. 16, 1940

2,197,596

UNITED STATES PATENT OFFICE 2,197,596

BOTTLE WIPER

Ralph Alfred Short, Champaign, Ill.

Application July 14, 1938, Serial No. 219,251
Renewed March 5, 1940

1 Claim. (Cl. 15—210)

This invention relates to wipers especially adapted for removing water and particles of ice from bottle drinks prior to serving and has for the primary object the provision of a portable or hand device of this character which will be efficient and inexpensive and may be readily passed over a bottle from end to end thereof so that water and pieces of ice will be thoroughly removed from the bottle and which will be simple in construction, durable and may be readily repaired when worn.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating a bottle wiper constructed in accordance with my invention.

Figure 2 is a sectional view taken on the line 2—2 showing the device applied to a bottle, the latter being indicated by dot and dash lines.

Figure 3 is a detail sectional view taken on the line 3—3 of Figure 1.

Figure 4 is a fragmentary top plan view illustrating a modified form of my invention.

Referring in detail to the drawing, the numeral 5 indicates a frame carrying a wiper strip 6 and a handle 7. The frame 5 with the wiper strip 6 may be readily passed over the walls of a bottle from end to end of said bottle for the purpose of removing water, particles of ice and other foreign matter therefrom, so that the bottle will be in a condition for serving the contents with the outside of the bottle in a substantially dry condition and in a sanitary manner.

The frame 5 consists of superimposed annular members 8 and 9 detachably connected by screws or like fasteners 10 which also pass through the wiping strip 6 securing the latter between the annular members and projecting beyond the inner peripheries of said members so that a major portion of the wiping strip may readily flex and conform to the contour of the walls of a bottle when moved thereover to thoroughly remove moisture, ice and other foreign matter therefrom. The handle 7 is formed integrally with the member 8 and is provided with an opening 11 adjacent the free end thereof so that the entire device may be readily suspended from a support, such as a nail, hook or the like. The wiping strip being removably mounted between the members 8 and 9 permits said wiping strip to be easily removed when worn and substituted by a new strip. It is preferable that the strip be constructed of rubber or some equivalent material capable of flexing and contracting tightly against the walls of the bottle when passing thereover.

Referring to my modified form of invention, as shown in Figure 4, the frame is indicated by the character 12 and consists of superimposed split annular members 13 to permit said members to expand and contract so that the device may be readily usable on bottles of different sizes. The members 13 are secured together by screws 14 with the annular wiping strip 15 secured therebetween. It is also preferable that the wiping strip 15 be split to allow for expansion and contraction. However, the ends of the wiping strip are brought into overlapping relation to underlie the split ends of the members 13.

A device constructed in accordance with the foregoing description and as shown in the drawing will be very convenient to handle and extremely efficient in the wiping of the walls of the bottle of moisture and other foreign matter and may be readily hung on a nail or like support when not in use. Further, it is to be noted that this device is easily repaired, that is when the wiping strip has become worn or loses its elasticity by simply removing and discarding the worn strip and substituting a new one in lieu thereof.

It is believed that the foregoing description, when taken in connection with the drawings will fully set forth the construction and advantages of this invention to those skilled in the art to which such invention relates so that further detailed description will not be necessary.

Having thus described my invention, what I claim is:

A bottle wiper comprising a ring-like frame for passage over the bottle radially split for expansion to accommodate therein bottles of different sizes, said frame comprising a pair of superimposed flat annular members, and fasteners securing the members together, and a ring-like wiper strip of flexible material clamped between said members and projecting beyond the inner peripheries thereof, said strip being radially split to provide for expansion thereof with said frame, the ends of said strip overlapping in sliding engagement to maintain the continuity of said strip under such expansion, and said overlapping ends bridging the split in the frame for expansion of the strip in correspondence with the degree of expansion of said frame.

RALPH ALFRED SHORT.